United States Patent [19]
Gutknecht et al.

[11] Patent Number: 5,625,175
[45] Date of Patent: Apr. 29, 1997

[54] METHOD AND APPARATUS FOR CONTROLLING THE MOVEMENT OF ELEVATOR CAR DOORS

[75] Inventors: Norbert Gutknecht; Andreas Sukale, both of Berlin, Germany

[73] Assignee: Inventio AG. Hergiswil NW, Switzerland

[21] Appl. No.: 375,281

[22] Filed: Jan. 19, 1995

[30] Foreign Application Priority Data

Jan. 28, 1994 [EP] European Pat. Off. ............... 94101255

[51] Int. Cl.$^6$ ................................................... B66B 13/14
[52] U.S. Cl. .......................................... 187/316; 318/265
[58] Field of Search .................................. 187/316, 317, 187/29 R; 318/257, 264, 265, 260

[56] References Cited

U.S. PATENT DOCUMENTS

| | | | |
|---|---|---|---|
| 4,342,379 | 8/1982 | Games et al. | 187/29 R |
| 4,498,033 | 2/1985 | Airara et al. | 318/261 |
| 4,501,344 | 2/1985 | Uherek et al. | 187/29 R |
| 4,776,433 | 10/1988 | Lagree et al. | 187/103 |
| 4,832,158 | 5/1989 | Farrer et al. | 187/103 |
| 4,980,618 | 12/1990 | Milnes et al. | 318/265 |
| 5,162,711 | 11/1992 | Heckler | 318/264 |
| 5,274,312 | 12/1993 | Gerstenkorn | 318/617 |
| 5,378,861 | 1/1995 | Barten et al. | 187/316 |
| 5,384,439 | 1/1995 | Erneke et al. | 187/316 |

FOREIGN PATENT DOCUMENTS

| | | | |
|---|---|---|---|
| 0031721 | 7/1981 | European Pat. Off. | B66B 13/14 |
| 0406784 | 1/1991 | European Pat. Off. | G05B 19/415 |
| 1267290 | 10/1989 | Japan | B66B 13/14 |
| 3172293 | 7/1991 | Japan | B66B 13/14 |
| 4032488 | 2/1992 | Japan | B66B 13/22 |
| 4201969 | 7/1992 | Japan | B66B 13/14 |

*Primary Examiner*—Robert Nappi
*Attorney, Agent, or Firm*—Howard & Howard Attorneys

[57] ABSTRACT

An apparatus and a method for moving an elevator door utilizes computed travel curves to control a door drive. The actual speed and position of the door are inputs to a travel curve computer in which travel curve algorithms are stored. Constants used in the algorithms are freely selectable and are communicated to the computer through a terminal connected to the computer. The computer generates target values a regulator which controls a power unit connected to the door drive motor for the opening, closing and reversing operations of the door.

15 Claims, 8 Drawing Sheets

METHOD AND APPARATUS FOR CONTROLLING THE MOVEMENT OF ELEVATOR CAR DOORS

BACKGROUND OF THE INVENTION

The present invention relates generally to an apparatus and method for controlling elevator car doors and, in particular, to an apparatus and method for controlling elevator doors with a continuous travel curve.

A door drive having a motor connected to a door mechanism by a shaft is shown in the U.S. Pat. No. 4,980,618. A current supply controlled by a microcomputer feeds electrical power to the motor. The rotational direction and rotational speed of the shaft are detected by a sensor and input to the microcomputer which controls the opening, closing and, in the case of obstacles, reversing of the door according to a predetermined speed profile. During the operations of opening and closing, the door is accelerated from a minimum speed to a maximum speed, maintained at the maximum speed and retarded to the minimum speed shortly before the end of the opening or closing operation. If the door meets an obstacle during the operations of openings and closing, the door is reversed according to two procedures implemented in the microcomputer. In a first procedure, the reversing operation is initiated on the basis of a speed change. A drop in the speed of the door below a certain speed value indicates to the microcomputer that an obstacle has been encountered in the travel path of the door, which indication initiates the reversing operation. In a second procedure, the reversing operation is initiated by sudden reversal of the travel direction of the door.

A disadvantage of the above described apparatus is that no optimization of the movement of the door is possible since the predetermined speed profile consists of straight line segments.

SUMMARY OF THE INVENTION

The present invention concerns an apparatus and method for operating an elevator door according to a continuous travel curve depicting the speed as a function of the position of the door for the operations of opening, closing and reversal. An algorithm includes at least one mathematical function for computing the continuous travel curve by inputting door speed and door position values for at least a beginning point and an ending point along a travel path of the elevator door. When a door operation command signal is generated by an elevator control associated with the elevator door the algorithm controls movement of the elevator door by generating a door drive control signal to a door drive control for the elevator door. The door drive control signal representing the difference between the actual value of the door speed and the travel curve valve of the door speed at the same door position.

The apparatus and method according to the present invention avoids the disadvantages of the known equipment and forms a jerk-free travel curve during the operations of opening, closing and reversal.

The advantages of the apparatus and method according to the present invention are that the door can be stopped and reversed at each instant of the movement sequence without the rotational speed of the motor or the speed of the door changing suddenly, which thereby avoids stress on the door drive mechanism. Thus, noises, which are caused by vibrations of the door panels, can be avoided.

A further advantage is that the movement of the door is adaptable to changing load conditions dependent on the direction of movement and actual changing reversal conditions.

2

An aesthetic course of movement is provided as well as shorter opening and closing times of the door are a further result of the invention.

BRIEF DESCRIPTION OF THE DRAWINGS

The above, as wall as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
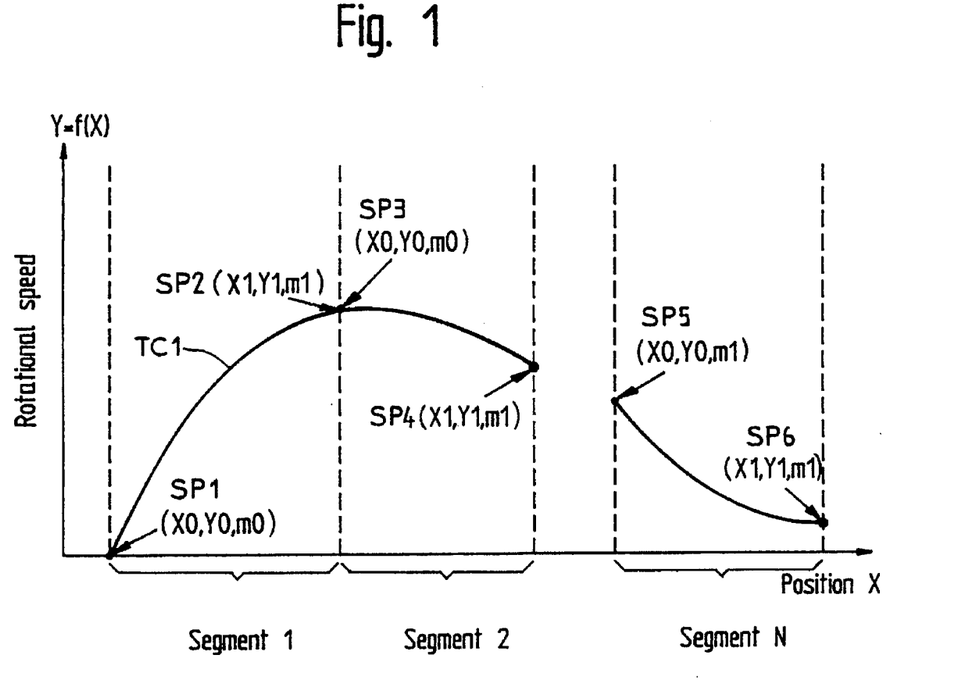
FIG. 1 is a diagram of a door travel curve plotted as speed versus position for an elevator door operator controlled in accordance with the present invention.

The present invention relates to drives, for example door drives, in which masses, for example doors, are moved linearly and at variable speed in dependence upon position along a travel path. The door movement is based upon a travel curve which is computed in dependence on the door position by utilizing predetermined parameters. The door position information is, for example, generated by an incremental transmitter such as a shaft encoder mounted on the drive shaft of the door drive motor. The door movement is expediently represented in a co-ordinate system which, as shown in the FIG. 1, is plotted as rotational speed values "Y=f(X)" of the door drive as a function of the position "X" of the door along the path of travel. The travel curve can be formed of as many curve segments as desired, which curve segments correspond to predetermined mathematical functions. The entire travel curve is defined by a few characteristic points which are identified as support points. Only the co-ordinates of these support points must be defined in order to generate any desired travel curve from the predetermined curve segments.

As shown in the FIG. 1, each curve segment is bounded by two support points with adjacent segments sharing a common point. The travel curve determined thereby must be computed so that the individual support points are connected together. Since the travel curve may have no steps or kinks, so-called points of discontinuity, the support points cannot simply be connected by several different straight lines. The transition from one curve segment into another is continuously differentiable so that the mathematical functions meeting at the support points have the same slope. The number of the segments and associated support points can be variable and unlimited.

As shown in the FIG. 1, each travel curve is formed of several curve segments: Segment 1, Segment 2, . . . Segment N. Although the functions within the individual curve segments could theoretically have any desired order of the form $$Y=A\cdot X^n+B\cdot X^{n-1}+C\cdot X^{n-2}+,$$

parabolic functions of the third order of the form $$Y=A\cdot X^3+B\cdot X^2+C\cdot X+D$$

are used for the sake of simplicity, wherein individual constants (A, B, C, D) can also have a value of zero. The functions of the adjacent segments must have the same slopes at the common support points so that the function of the one segment flows smoothly into the function of the next segment. For example, the Segment 1 begins at a first support point SP1(X0, Y0, m0) and ends at a second support point SP2(X1, Y1, m1). The Segment 2 begins at a third support point SP3(X0, Y0, m0), which also is the second support point for the Segment 1, and ends at a fourth support point SP4(X1, Y1, m1), which also is the beginning support point for the third curve segment (not shown). The Segment N begins at a fifth support point SP5(X0, Y0, m0), which also is the ending support point for the previous curve segment (not shown), and ends at a sixth support point SP6(X1, Y1, m1). For the computation of the functions of the individual curve segments, the four constants A, B, C and D must be determined, for which four independent equations are set up. Two of these equations are obtained from the co-ordinates of the beginning or left-hand support point (X0, Y0) and the ending or right-hand support point (X1 ,Y1) between which the function is to be computed. The third and the fourth equations are obtained from the first slope (m0) at the beginning support point and the second slope (m1) at the ending support point.

The following three cases are now to be distinguished:
Case 1, where the segment is a straight line, $$A=0;\ B=0;\ C><0; \text{and } D><0.$$

Case 2, where the segment is an $X^2$ parabola, $$A=0;\ B><0;\ C><0;\text{ and }D><0.$$

Case 3, where the segment is an $X^3$ parabola:

$$A><0;\ B><0;\ C><0;\text{ and }D><0.$$

The straight line, when the first support point (X0, Y0) and the second support point (X1, Y1) are given, is computed as follows:

$$A=0 \hspace{5em} 1.$$

$$B=0 \hspace{5em} 2$$

$$C=m0=m1=(Y1-Y0)/(X1-X0) \hspace{2em} 3$$

$$D=Y0-C\cdot X0 \hspace{5em} 4$$

The $X^2$ parabola, when the first support point (X0, Y0), the second support point (X1, Y1) and the first slope (m0) are given, is computed as follows:

$$A=0 \hspace{5em} 1$$

$$Y0=B\cdot X0^2+C\cdot X0+D \hspace{3em} 2$$

$$Y1=B\cdot X1^2+C\cdot X1+D \hspace{3em} 3$$

$$m0=2\cdot B\cdot X0+C \hspace{5em} 4$$

Upon solving this set of equations, the constants are:
$C=[Y1-(m0\cdot X1^2)/(2\cdot X0)+(\frac{1}{2}\cdot X0\cdot m0)\ -Y0]/[X1-(X1^2)/(2\cdot X0)-(\frac{1}{2}\cdot X0)];\ B=(m0-C)/(2\cdot X0);\text{ and } D=Y1-B\cdot X1^2-C\cdot X1.$ The $X^3$ parabola, when the first support point (X0, Y0), the second support point (X1, Y1), the first slope (m0) and the second slope (m1) are given, is computed as follows, with the following substitutions made for clarity:

K1=X1–X0; K2=X1$^2$–X0$^2$; K3=X1$^3$–X0$^3$; K4=3·X1$^2$– (K3/K1); and K5=2·X1–(K2/K1).

Upon solving this set of equations, the constants are:
$A=[K5\cdot(m1-m0)/(2\cdot K1)-(Y0-Y1)/(K1)-m1]/[(3\cdot K2\cdot K5)/(2\cdot K1)-K4];$ $B=(m1-m0-(3\cdot K2\cdot A))/(2\cdot K1);\ C=m1-(3\cdot X1^2 A)-(2\cdot X1\cdot B);\text{ and}$ $D=Y0-(A\cdot X0^3)-(B\cdot X0^2)-(C\cdot X0).$ After these computations are performed for all of the curve segments, a continuous travel curve TC1 is obtained as shown in the FIG. 1.

Figure 2:
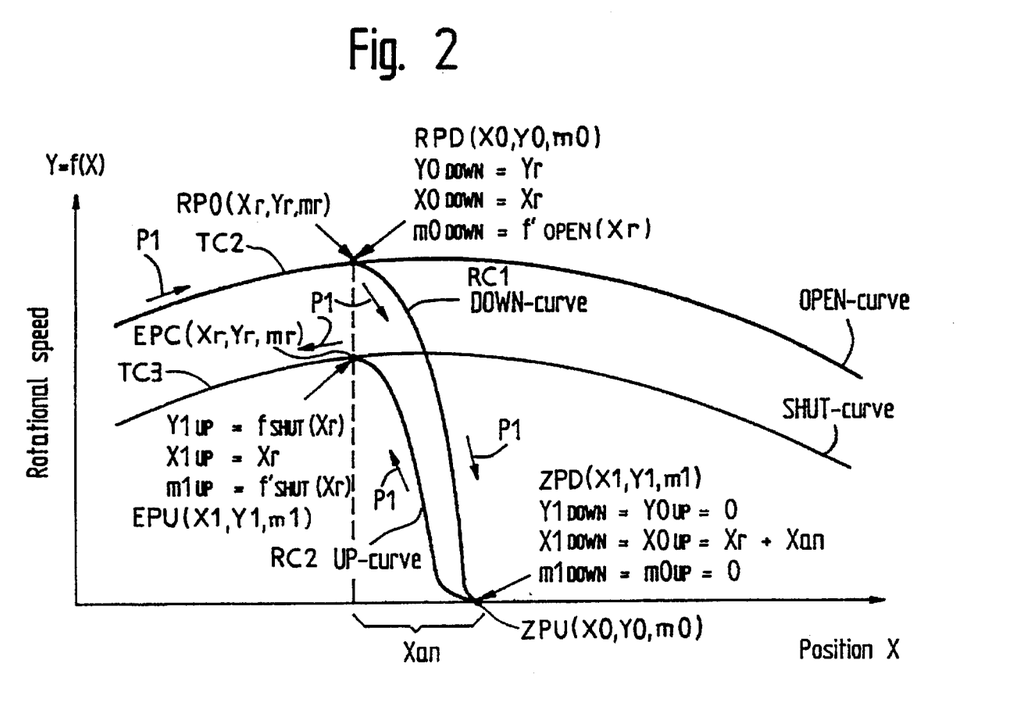
FIG. 2 is a diagram of a door travel curve plotted as speed versus position for a reversing operation of an elevator door operator controlled in accordance with the present invention.

For all door drives in which the movement must meet different requirements according to the direction of travel, for example a reduction in the speed in one direction required by regulations, a different travel curve for each direction of movement is desirable as shown in the FIG. 2. Also, the door must be capable of being stopped and moved in the opposite direction at any desired instant of the movement sequence. In order to be able to execute the change in the rotational speed continuously, a suitable function must be found which causes no steps or jumps and which begins at an initiate reversal point RPO(Xr, Yr, mr) on a first travel curve TC2 OPEN CURVE of the opening operation as shown in the FIG. 2. Such a function is bounded by the initial reversal point RPO at the instant of the occurrence of the cause of the door reversal and by a stopping or zero speed point ZPD(X1, Y1, m1), whereby a reversal curve segment (Xan) is defined in which corresponding first and second reversal curves are to be computed.

After the door has come to standstill at the stopping point ZPD, it must be accelerated in the opposite direction to join a second travel curve TC3 CLOSE CURVE of the opposite direction of travel. A respective $X^3$ parabola, first reversal curve RC1 DOWN curve and second reversal curve RC2 UP curve, is computed for the braked and the accelerated movement phase of the entire reversal operation. It is possible to form both of the movement phases, RC1 and RC2, of the reversal curve from several curve segments. The path of travel of the door is denoted by arrows P1 in the FIG. 2. Beginning at the left-hand side of the TC2 first travel curve, the door follows the travel curve until it encounters an obstacle at the curve point RPO(Xr, Yr, mr) whereupon it enters the RC1 first reversal curve having a beginning point RPD(X0, Y0, m0) at the point RPO. The door continues to the stopping point ZPD and then enters the RC2 second reversal curve at a beginning point ZPU(X0, Y0, m0). The door passes from the RC2 curve at an exit point EPU(X1, Y1, m1) to the TC3 second travel curve at an entry point EPC(Xr, Ye, mr) at the point EPU. The slope of the RC1 curve in the reversal segment Xan determines whether the deceleration to the zero rotational speed of the door drive motor takes place hard or gently. The length of the stopping path "Xan" determines the braking and accelerating energy to be exerted and the maximum motor torque required. After the reversal of the direction of movement at the stopping point ZPD, the door movement takes place according to the RC2 curve to enter the TC3 curve at any desired point EPU/EPC for the closing operation. The RC2 curve need not enter the TC3 curve at the same position along the "X" axis as the RC1 curve was initiated. The first slope (m0) for the RC1 curve and the second slope (m1) for the RC2 curve are obtained by the derivative f'(X) at the corresponding point. In addition to the aforementioned parabolic functions, straight lines or other mathematical functions are also possible for each curve segment.

Figure 3:
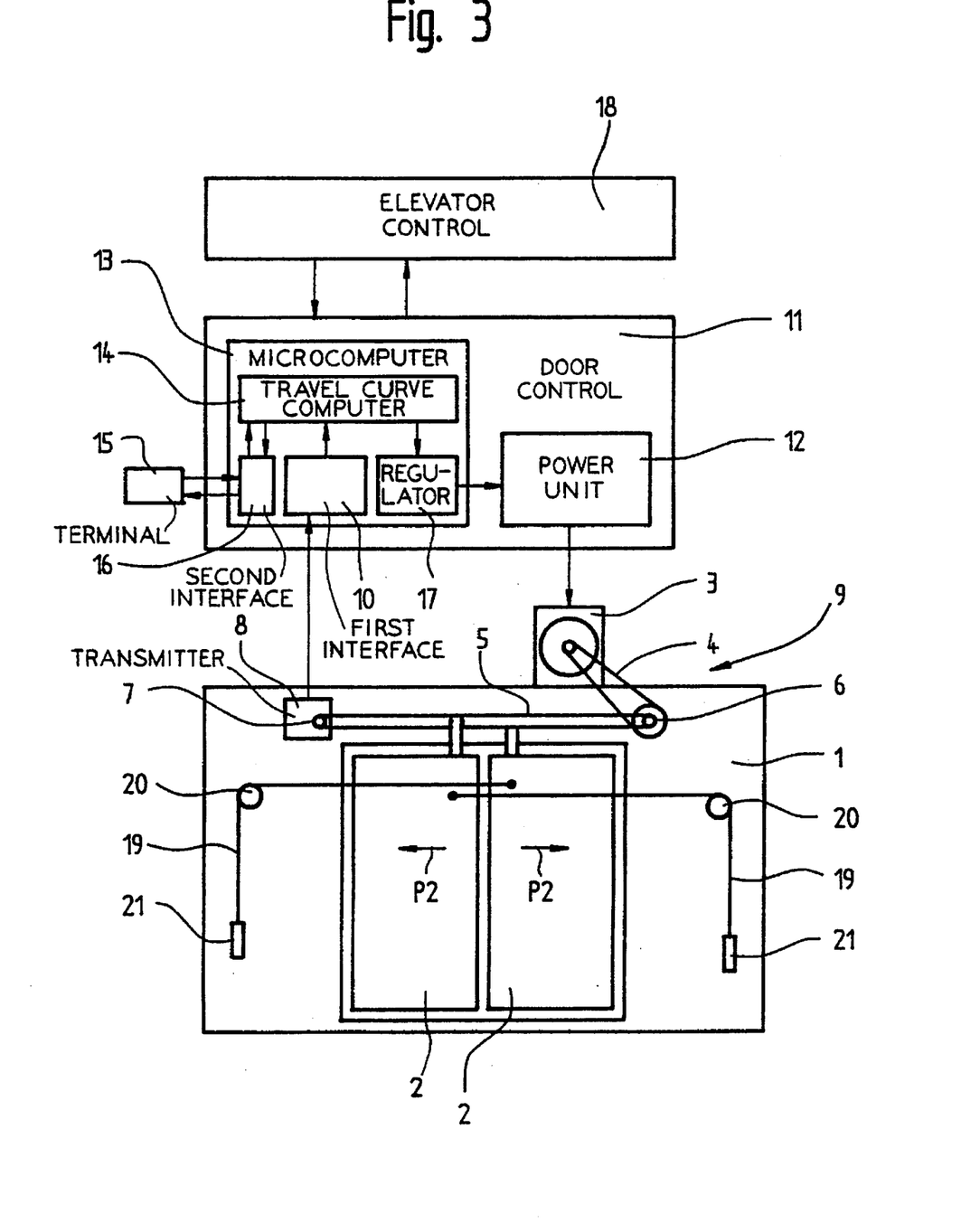
FIG. 3 is a schematic diagram of an elevator door operator and an operator control in accordance with the present invention.

A door operator and operator control according to the present invention are illustrated in the FIG. 3. An elevator car 1 has a pair of door panels 2 which are driven along a travel path by a door drive 9. The drive 9 has an electric motor 3 driving a first toothed belt 4 which rotates a drive roller 6. The drive roller 6 drives a second toothed belt 5 which rotates a first deflecting roller 7 and an incremental transmitter 8. A pair of arrows 172 indicate the opening direction of movement of the door panels 2. The motor 3 is supplied with electrical energy by connection to a power unit 12 included in a door control 11. The incremental transmitter 8 has an output connected to an input of a first interface 10 of a microcomputer 13 to provide a signal representing the distance travelled by and the speed of the door panels 2. An output of the interface 10 is connected to an input of a travel curve computer 14 in the microcomputer 13. Algorithms implemented in the travel curve computer 14 utilize the signal from the incremental transmitter 8 to control the operation of the door drive 9. Constants needed in the computation procedure are freely selectable and are communicated to the computer 14 by a terminal 15 which is connected through a second interface 16 of the microcomputer 13 to the computer 14. The travel curve computer 14 has an output connected to an input of a regulator 17 to generate target values and actual values of the door panel speed. The regulator 17 has an output connected to an input of the power unit to control the power output of the unit 12 accordingly. An elevator control 18, connected to and superordinate to the door control 11, initiates the opening movement of the door panels 2 and dispatches the elevator car 1 when the door is closed.

For the determination of door parameters, each door panel 2 is connected to a cable pull 19 which extends around a second deflecting roller 20 and is connected with a closing weight 21. The door parameters are ascertained in a learning process explained in more detail below in connection with the FIGS. 8–10 and are used for the generation of a travel curve matched to the door parameters.

Figure 4:
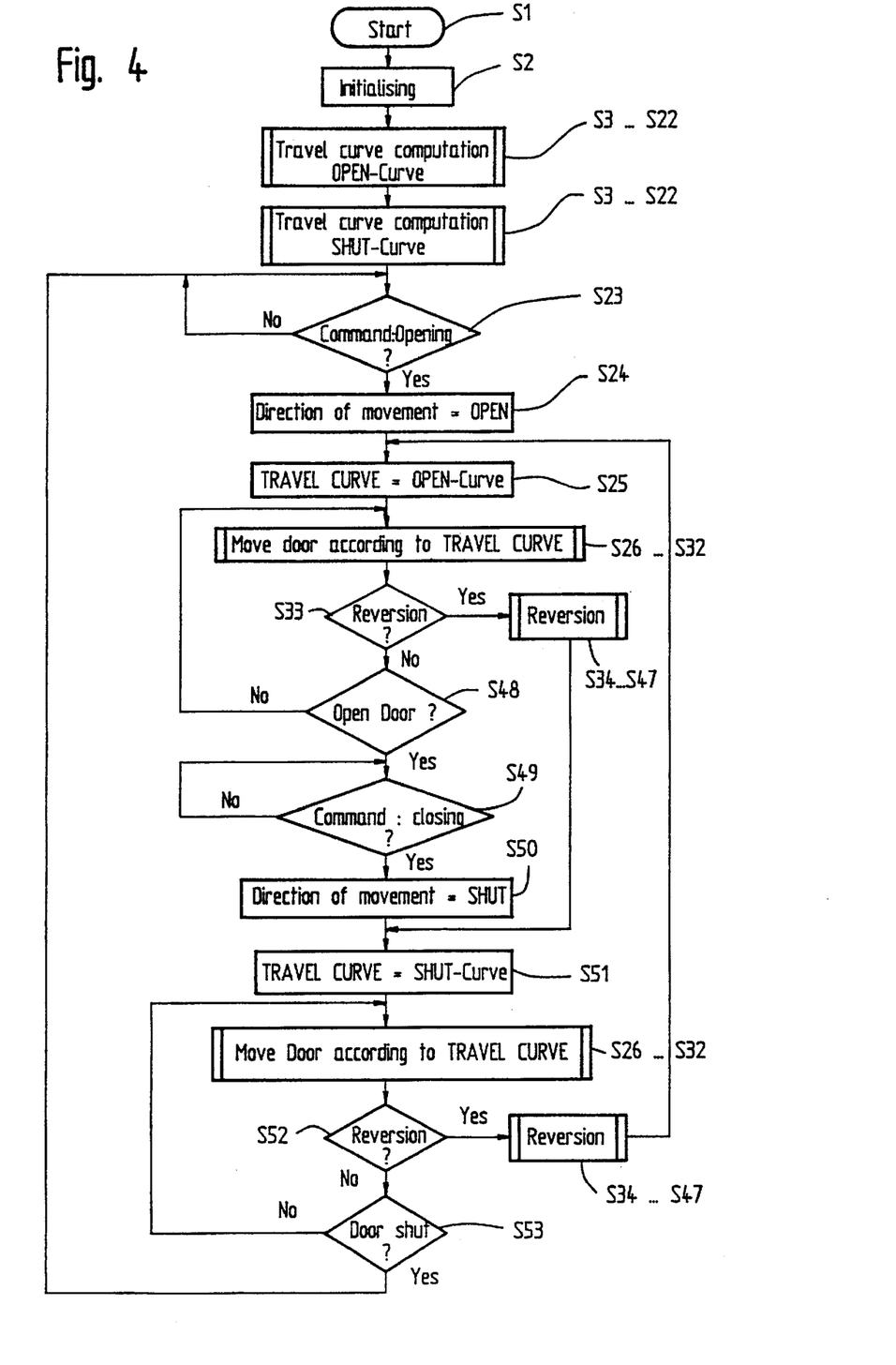
FIG. 4 is a flow diagram of a first routine for the control of elevator door movement according to the travel curves shown in the FIG. 2.

In the FIG. 4 there is shown the structure and the sequence of a first routine incorporating a first algorithm (ALGO1) for the control of the door movement according to the travel curves shown in the FIG. 2. The algorithm ALGO1 is started in a first step S1. All constants and variables used in the algorithm ALGO1 are initialized in known manner in a step S2. The steps S3 through S22 form a second algorithm (ALGO2) and comprise the travel curve computation of the first travel curve TC2 OPEN CURVE and the travel curve computation of the second travel curve TC3 CLOSE CURVE shown in the FIG. 2. The structure and the sequence of the algorithm ALGO2 for the computation of travel curves for the operations of opening and closing the door are explained in more detail below in connection with the FIG. 5. In a step S23, a check is made for a command for opening the door which command has been generated by the elevator control 18. In the case of the absence of such a command, denoted by "NO", the algorithm ALGO1 repeats the step S23. A positive result, denoted by "YES", leads to the execution of a step S24 in which the value "OPEN" is associated with the direction of movement. In a following step S25, the first travel curve TC2 OPEN CURVE is associated with "TRAVEL CURVE" which is defined as variable. Then, the algorithm ALGO1 controls the opening movement of the door according to a third algorithm (ALGO3) illustrated as steps S26 to S32, which steps are shown in more detail in the FIG. 6.

In a following step S33, a check is made of whether calls exist for initiation of the door reversal. A positive result, denoted by "YES", starts a fourth algorithm (ALGO4) comprising steps S34 to S47 for the reversing operation according to the FIG. 7. Subsequently, the algorithm ALGO1 continues to a step S51. In the case of a negative result at the step S33, denoted by "NO", a check shown in a step S48 is carried out in which it is tested whether the open setting of the door has already been reached. In the case of a negative result, denoted by "NO", the algorithm ALGO1 carries out steps S26 through S48 again. A "YES" result of the test performed in the step S48 initiates a step S49, in which a check is made whether a command for closing of the door has been generated by the elevator control 18. In the case of a negative result, denoted by "NO", the algorithm ALGO1 repeats the step S49. A positive result, denoted by "YES", of the test in the step S49 leads to the execution of a step S50, in which the value "CLOSE" is associated with the movement direction. In a following step S51, the second travel curve TC3 CLOSE CURVE is associated with "TRAVEL CURVE". Then, the algorithm ALGO1 controls the closing movement of the door according to the algorithm ALGO3 illustrated in the steps S26 through S32 of the FIG. 6. In a following step S52, it check is made whether there is cause for initiation of the door reversal. A positive result, denoted by "YES", starts the algorithm ALGO4 comprising the steps S32 through S47 for the reversing operation according to the FIG. 7. Subsequently, the algorithm ALGO1 returns to the step S25. In the case of a negative result, denoted by "NO", of the test performed in the step S52, a check shown in a step S53 is executed, in which it is tested whether the closed setting of the door has already been reached. In the case of a negative result, denoted by "NO", the algorithm ALGO1 executes the steps S26 through S32, S52, S34 through S47 and S53 anew. In the case of a result denoted by "YES", of the test performed in the step S53, the algorithm ALGO1 returns to the step S23.

Figure 5:
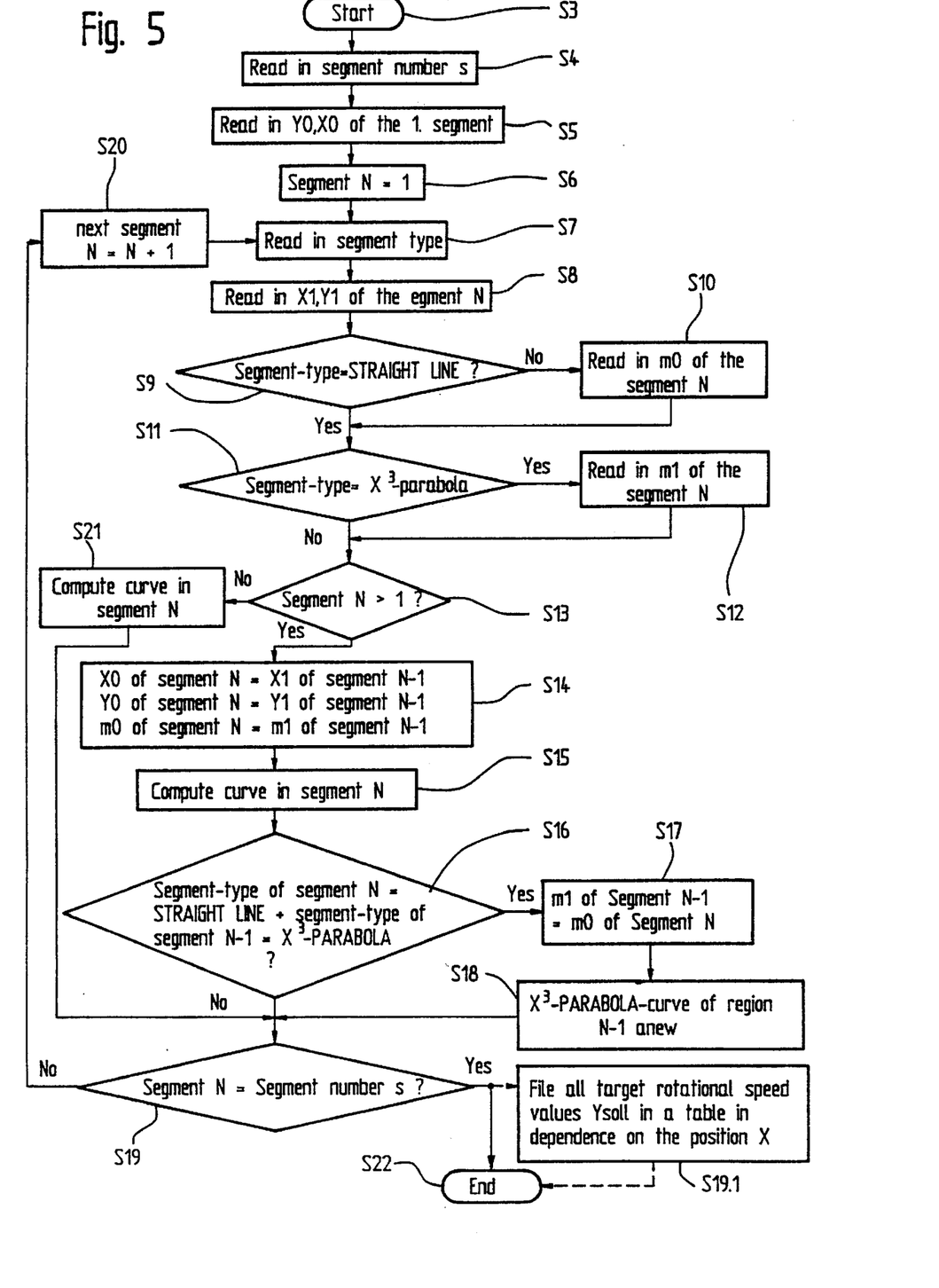
FIG. 5 is a flow diagram of a second routine shown in the FIG. 4 for the computation of travel curves for the operations of opening and closing as well as reversing elevator door movement.

There is shown in the FIG. 5 the structure and sequence of the second algorithm ALGO2 for the computation of travel curves in the form of function equations for the operations of opening and closing as well as reversal of the door. The algorithm ALGO2 is started in the step S3. In a step S4, the algorithm ALGO2 reads the number of segments "s" entered at the terminal 15. In a step S5, the algorithm ALGO2 reads the starting point of the curve entered at the terminal 15 in the form of the first support point (X0, Y0) of the first segment. In a step S6, the value "1" is associated with the "Segment N" to begin the first segment.

In a step S7, the algorithm ALGO2 reads the segment type entered at the terminal 15, wherein the segment type can be a straight line, an Xparabola or an $X^3$ parabola. In a step S8, the algorithm ALGO2 reads the end point of the first segment entered at the terminal 15 in the form of the second support point (X1, Y1). In a following step S9, a check is made whether a straight line has been associated with the segment type entered in the step S7. A negative result, denoted by "NO", of the test performed in the step S9 leads to a step S10, in which the algorithm ALGO2 reads the first slope (m0) entered at the terminal 15 for the start point of the "Nth" segment. A positive result, denoted by "YES", of the test performed in the step S9, as well as the conclusion of the step S10, leads to a step S11 in which a check is made whether an $X^3$ parabola has been associated with the segment type in the step S7. A positive result, denoted by "YES", of the test performed in the step S11 leads to a step S12 in which the algorithm ALGO2 reads the slope (m1) entered at the terminal 15 for the end point of the "Nth" segment. A negative result, denoted by "NO", of the test performed in the step S11, as well as the conclusion of the step S12, leads to a step S13 in which a check is made whether at least one segment has already been computed. A negative result, denoted by "NO", of the test performed in the step S13 leads to the execution of a step S21 in which the curve of the first segment is computed. Subsequently, the algorithm ALGO2 continues to a step S19. A positive result, denoted by "YES", of the test performed in the step S13 leads to a step S14 in which the algorithm ALGO2 associates the first curve point (X0, Y0) and the first slope (m0) of the current segment with the second curve point (X1, Y1) and the second slope (m1) of the preceding segment. Then, the curve of the current segment is computed in a step S15.

In a step S16, a check is made whether the segment type of the current segment is a straight line and the segment type of the preceding segment is an $X^3$ parabola. A positive result, denoted by "YES", of the test performed in the step S16 initiates an association performed in a step S17 in which the first slope (m0) at the start point of the current segment is associated with the second slope (m1) at the end point of the preceding segment. In a following step S18, the $X^3$ parabola of the preceding segment is computed anew so that the end point (X1, Y1) of the $X^3$ parabola has the slope of the straight line. A negative result, denoted by "NO", of the test performed in the step S16, as well as the conclusion of the step S18, leads to the step S19 in which a check is made whether the number of the computed segments corresponds to the segment number "s" set in the step S4. In the case of a negative result, denoted by "NO", of the test performed in the step S19, the algorithm ALGO2 increases the value of the "Segment N" by "1" in a step S20 and returns to the step S7. In the case of a positive result, denoted by "YES", of the test performed in the step S19, the algorithm ALGO2 is terminated in the step S22.

Figure 6:
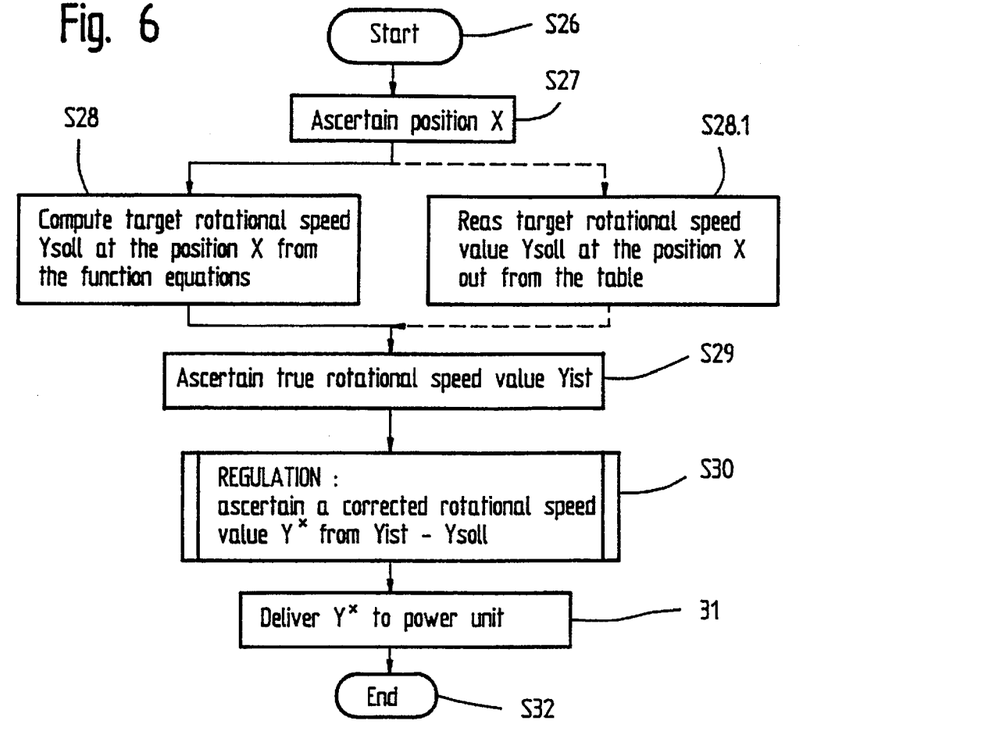
FIG. 6 is a flow diagram of a third routine shown in the FIG. 4 for the control of door movement according to a computed travel curve.

In the FIG. 6 there is shown the structure and the sequence of the algorithm ALGO3 for the control of the door movement according to a computed travel curve. In the step S26, the algorithm ALGO3 is started and enters a step S27 which reads the output of the incremental transmitter 8 through the first interface 10 to ascertain the position "X" of the door panels 2 therefrom. In a following step S28, the algorithm ALGO3 determines the target value of the rotational speed at the position "X" from the actual travel curve illustrated in the form of a function equation. In a step S29, the incremental transmitter 8 supplies the actual value of the rotational speed to the algorithm ALGO3, which generates a regulating deviation signal corresponding to the difference between the actual value and the target value of the rotational speed in a step S30 to the regulator 17. In a step S31, the regulator 17 generates a control signal to the power unit 12 proportional to the regulating deviation. The algorithm ALGO3 is completed in the step S32.

Figure 7:
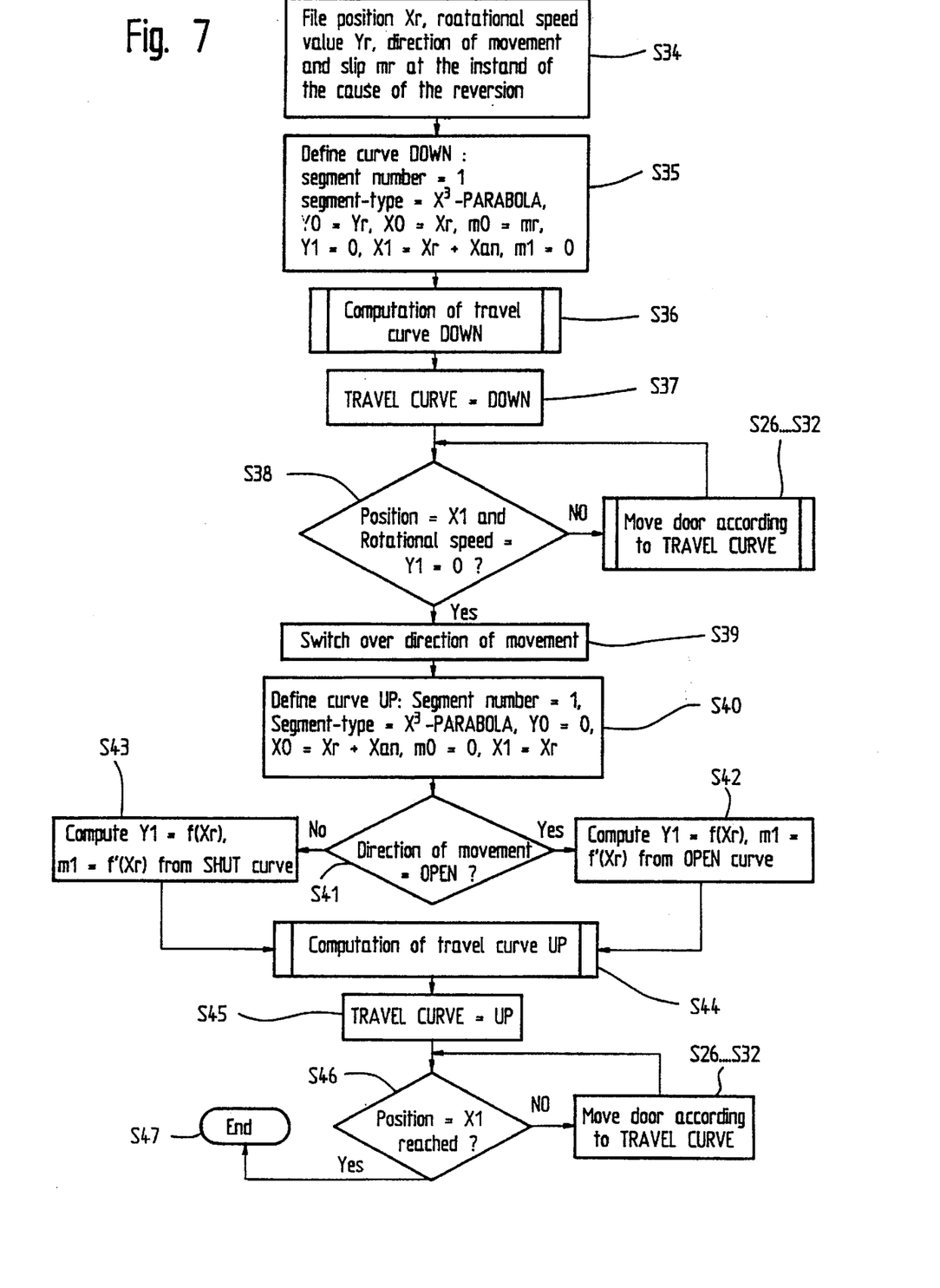
FIG. 7 is a flow diagram of a fourth routine shown in the FIG. 4 for the control of door movement during the reversing operation.

In the FIG. 7 there is shown the structure and the sequence of the algorithm ALGO4 for the control of the movement of the door during the reversing operation. A positive result, denoted by "YES", of the test performed in the step S33 in the FIG. 4 activates the algorithm ALGO4, which in the step S34 stores the position value "Xr", the rotational speed value "Yr", the direction of movement and the slope "mr" at the instant a cause for reversal is detected. Thereafter, the RC1 DOWN CURVE is defined in a step S35 in that all parameters necessary for the computation of an $x^3$ parabola segment are fixed. With these parameters, the algorithm ALGO4 computes the $X^3$ parabola segment in a step S36 with the aid of the algorithm ALGO2 and allocates it in a step S37 to the variable "TRAVEL CURVE". In a step S38, a check is made whether the door panels 2 have already come to a standstill. In the case of a negative result, denoted by "NO", of the test performed in the step S38, the algorithm ALGO3 controls the movement of the door panels 2 according to the steps S26 through S32 shown in the FIG. 6. A positive result, denoted by "YES", of the test performed in the step S38, leads to a step S39, in which the direction of movement of the door is changed. Subsequently, the RC2 UP CURVE is defined in a step S40 in that all parameters necessary for the computation of an $X^3$ parabola segment are fixed. In a step S41, the direction of movement is checked. A positive result, denoted by "YES", of the test performed in the step S41, initiates a step S42, in which the rotational speed value "Y1" and the slope "m1" at the reversal point RPO are computed from the first travel curve TC2 OPEN CURVE. A negative result, denoted "NO", of the test performed in the step S41, initiates a step S43, in which the rotational speed value "Y1" and the slope "m1" of the reversal point is computed from the second travel curve TC3 CLOSE DOOR. The steps S42 and S43 lead to a step S44, in which the algorithm ALGO4 computes the $X^3$ parabola segment with the parameters fixed in the step S40 with the aid of the algorithm ALGO2 and associates it with the variable "TRAVEL CURVE" in a step S45. In a step S46, a check is made whether the door panels 2 have already reached the position "X1" at the instant of the reversal. In the case of a negative result, denoted by "NO", of the test performed in the step S46, the algorithm ALGO3 controls the movement of the door panels 2 according to the steps S26 through S32 shown in the FIG. 6. A positive result, denoted by "YES", of the test performed in the step S46, initiates the step S47, which completes the algorithm ALGO4.

In the above example, the method and apparatus according to the present invention were explained by reference to a door drive with horizontally opening sliding doors. The method is however also suitable for door drives with vertically opening sliding doors, for door drives with rotating doors and for door drives with pivoting doors.

According to the FIGS. 4 and 5, the first travel curve TC2 OPEN CURVE and the second travel curve TC3 CLOSE CURVE are computed before the operations of opening and closing, for which the function equations are computed one after the other for each individual segment by reference to previously fixed support points. Consequently, the travel curves consist of a number of function equations which correspond to the number of segments. These function equations are filed in a storage region of the travel curve computer 14. In the steps S25 and S51, the variable "TRAVEL CURVE" is associated with the storage region in which the function equations for the target rotational speed computation are stored. During the course of the movement of the door, each target rotational speed value at the position "X" is computed sequentially in the step S28 from the corresponding function equation.

The first reversal curve RC1 UP CURVE and the second reversal curve RC2 DOWN CURVE are always computed at the instant that the cause for the reversal is detected. In the steps S37 and S45 of the FIG. 7, the variable "TRAVEL CURVE" is associated with the storage region in which the function equations for the target rotational speed computation are stored. During the course of the door movement, each target rotational speed value at the position "X" is computed in the step S28 sequentially from the corresponding function equation.

In an alternate embodiment of the present invention, the target rotational speed values of the travel curves TC2 OPEN CURVE and TC3 CLOSE CURVE, for all possible position values, are computed from the aforementioned function equations and filed in a table. This additional step is denoted by S19.1 in the FIG. 5. In the steps S25 and S51, the variable "TRAVEL CURVE" is associated with the storage region in which the table with the target rotational speed values and position values is stored. As shown in the FIG. 6, a step S28.1, in which the target rotational speed value at the position "X" is read out from the table, is executed in the place of the step S28 during the course of the door movement. This variant of execution has the advantage that the travel curve computer 14 need not carry out any time-intensive computation during the course of the door movement, provided that no causes of reversal are present.

Figure 8:
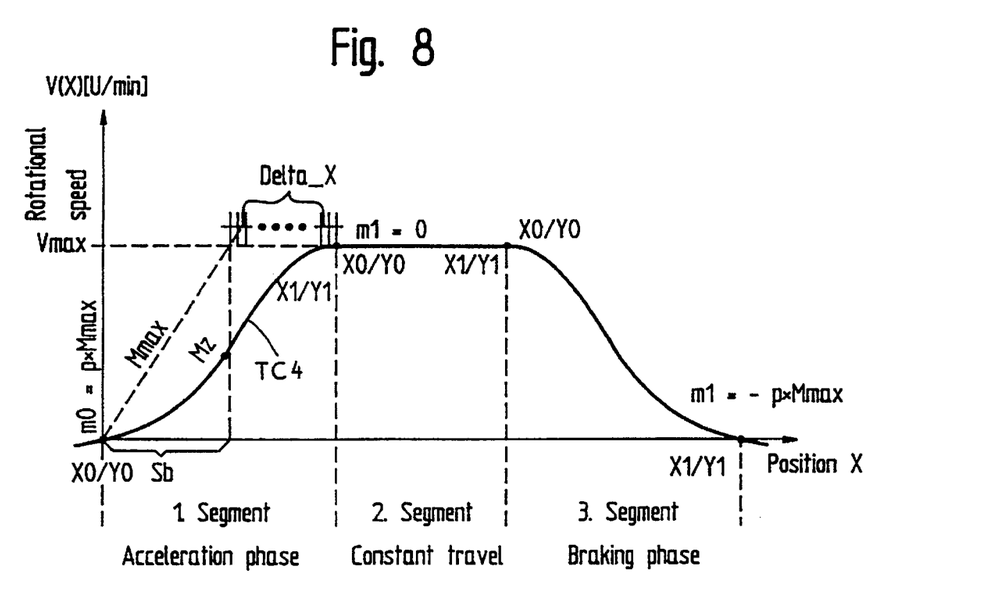
FIG. 8 is a diagram of a door travel curve matched to door parameters according to an alternate embodiment of the present invention.
Figure 9:
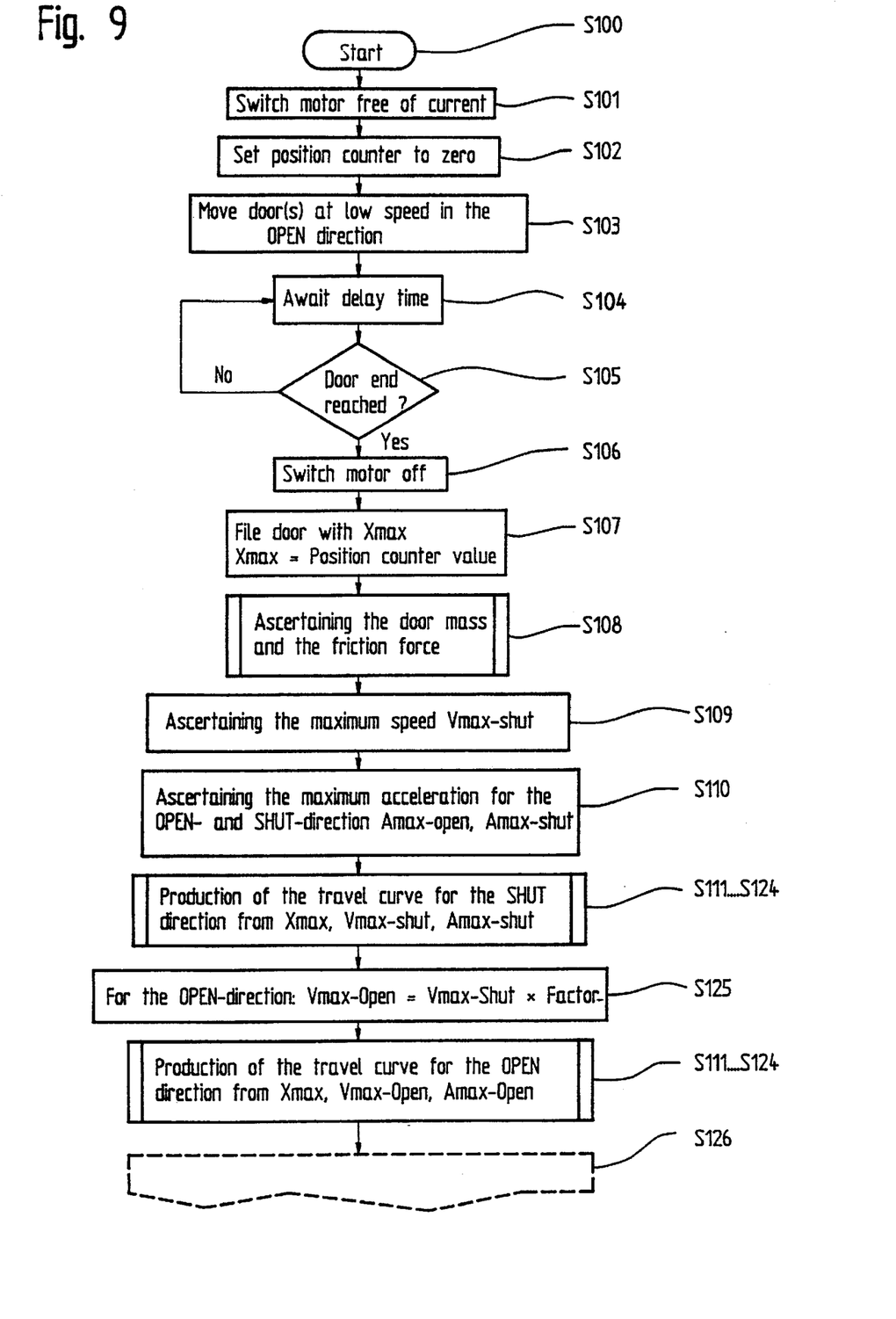
FIG. 9 is a flow diagram of a fifth routine for the control of a learning process for ascertaining the door parameters used in the travel curve shown in the FIG. 8.
Figure 10:
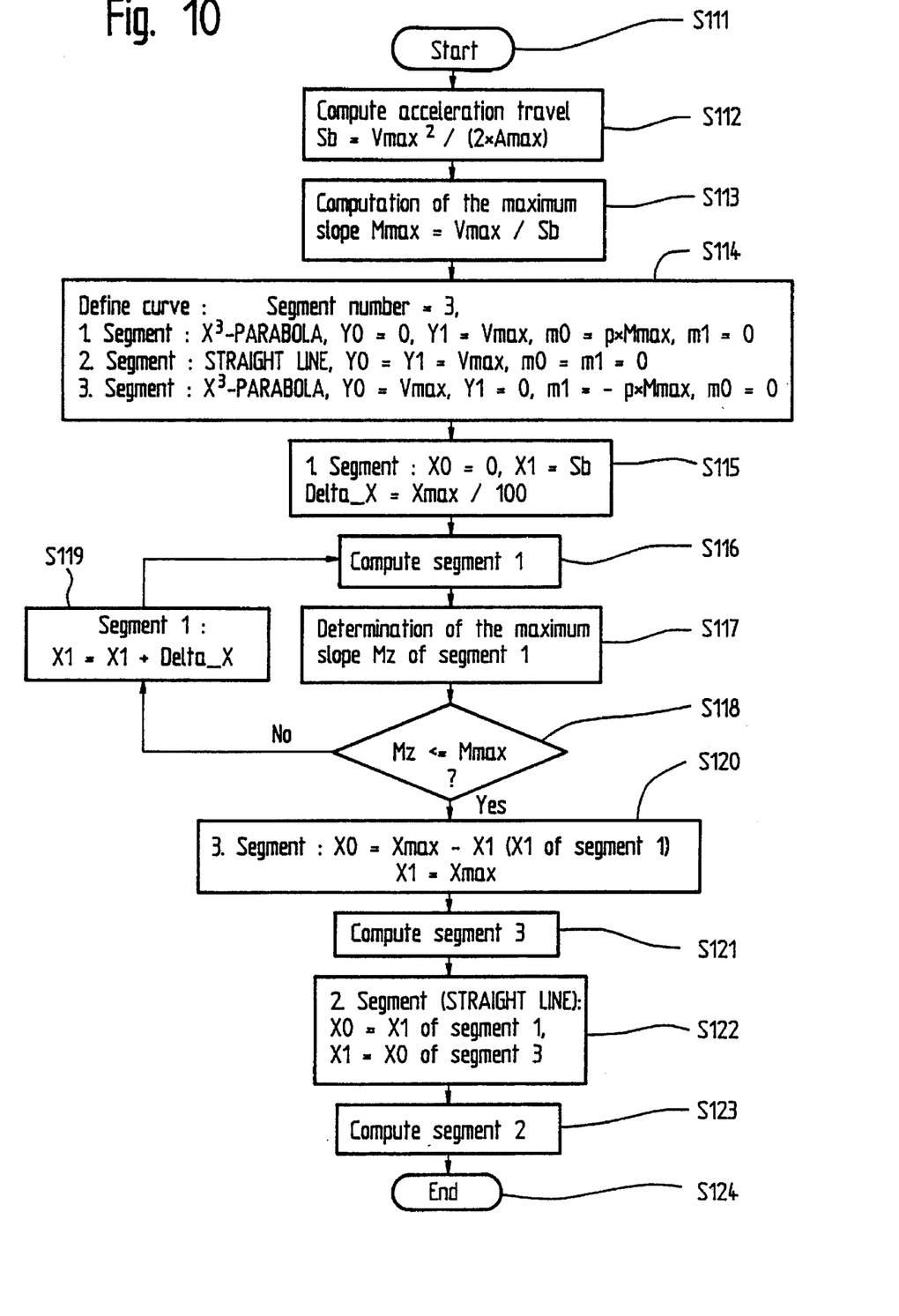
FIG. 10 is a flow diagram of a sixth routine shown in the FIG. 9 for the computation of travel curves, which are matched to door parameters, for the operations of opening and closing of elevator doors.

In the FIGS. 8 through 10, there is shown an example of another embodiment of the present invention in which travel curves matched optimally to the door to be opened and closed are computed from door parameters ascertained in a learning process. Great significance is attached to an optimized travel curve because, on the one hand, the maximum permissible closing speed is limited by reason of a maximum permissible door energy in the closing direction and, on the other hand, the shortest possible door opening and closing times are demanded. Since different kinetic conditions arise in respect of door mass, friction and motor torque for each door, even in the case of doors of identical construction, an optimized travel curve is necessary for each door. However, because this leads to an appreciable adjustment effort, it is desirable to build a door drive which detects the existing kinetic conditions and derives an optimum travel curve therefrom. Thus, the effort involved in adjusting new installations or after the replacement of individual components can be minimized.

For the performance of the learning process, a fifth algorithm ALGO5 according to the FIG. 9 is implemented in the microcomputer 13 and the closing weights 21 are arranged at the door panels 2 as shown in the FIG. 3. The parameters to be learned are the door mass and the door width. The procedure necessary for the recognition of door mass is described in the published European patent application 0 548 505. The door width is ascertained from the output of the incremental transmitter 8 during a door opening operation. The results of the learning process are converted into the parameters: a. "Vmax" (maximum speed from maximum door energy); b. "Amax" (maximum acceleration from limited motor torque); and c. "Xmax" (maximum incremental number from the door width). These parameters are stored in the travel curve computer 14. From these parameters, a travel curve (TC4 in the FIG. 8) can be computed according to a sixth algorithm ALGO6 shown in the FIG. 10. The travel curve TC4 consists of three segments, wherein the first and the third segments are each an $X^3$ parabola and the second segment is a straight line. As illustrated in the FIG. 8, each travel curve segment is associated with a movement phase wherein "Segment 1" is acceleration to "Vmax", "Segment 2" is travel at constant speed "Vmax" and "Segment 3" is braking from "Vmax" to zero speed.

The algorithm ALGO6 determines the support points necessary for the travel curve computation from the parameters "Vmax", "Xmax" and "Amax". In that case, the maximum slope of the $X^3$ parabola may not cause any greater acceleration than "Amax". Because the travel curve computation is represented in a co-ordinate system, in which the speed is shown as a function of the travel, the time-dependent parameter "Amax" must be converted into a travel-dependent parameter. The slope "Mmax" represents a change in speed per travel path (Vmax/Sb) and corresponds to a travel-dependent acceleration. According to the FIG. 10, the algorithm ALGO6 displaces the ending support point (X1, Y1) of the first segment by the value "Delta X" beginning with "Sb" and continuing to the right until the computed $X^3$ parabola between "XO" and "X1" displays a maximum slope of "Mz" which is at most equal to "Mmax". The Segment 3 corresponds to the mirror image of the Segment 1. During the braking phase, appropriately converse conditions prevail. The single possibility of variation for the shape of the curves consists in varying the slope in the first and last support points by a factor "p" from 0 to 99% of "Mmax". In the case of maximum slope at the first and last support points, the travel curves will have the phases of acceleration and braking which are as short as possible. This leads to the lowest possible closing times for a preset maximum speed of "Vmax" and for an acceleration of "Amax". During the opening movement, the attainable maximum speed is theoretically dependent only on the acceleration and the door width.

In case the learning process with the travel curves derived therefrom is repeated at certain intervals of time, the possibility exists for a door drive to adapt itself to given kinetic conditions and even to react to changes such as, for example, increasing friction. In that case, the input of parameters can be dispensed with entirely and the parameters of motor torque, weight of the closing weights 21, gear transmission ratio, resolution of the incremental transmitter 8 and the factor "p" are stored in a non-volatile storage device of the microcomputer 13.

The algorithm ALGO5 for the control of the learning process is explained in more detail in connection with the FIG. 9. The algorithm ALGO5 is started in a step S100 In a step S101, the motor 3 is switched off. At the same time, the door 2 is closed automatically by means of the closing weights 21. In the closed setting of the door 2, a position counter implemented in the microcomputer 13 and counting the pulses of the incremental transmitter 8 is calibrated in a step S102. Then, the motor 3 is turned on and opens the door 2 at slow speed in a step S103. With a small time delay shown in a step S104, the algorithm ALGO5 performs a test in a step S105, in which a check is made iteratively whether the door 2 has reached its end position. In the case of a negative result, denoted by "NO", of the test, the steps S104 and S105 are repeated. A positive result, denoted by "YES", of the test performed in the step S105 leads to the execution of steps S106 and S107, in which the motor 3 is switched off and the value of the position counter is associated with the parameter of door width "Xmax". In a step S108, the door mass and the friction force are ascertained according to a method described in the European published application 0 548 505. From the energy consideration E=½·m·V², wherein m=Door mass and E=ten joules as the maximum permissible door energy, the maximum door speed "Vmax-shut" during the closing operation is computed in a step S109. The maximum acceleration "Amax-open" for the opening operation and the maximum acceleration "Amax-shut" for the closing operation are computed in a step S110, wherein the maximum acceleration is computed from the motor torque, the friction force, the door mass and the closing weights 21. Subsequently, the algorithm ALGO6, which is shown in the FIG. 10, is activated and steps S111 through S124 produce the travel curve for the closing operation from the parameters "Xmax", "Vmax-shut" and "Amax-shut". In a step S125, the maximum door speed "Vmax-open" for the opening operation is computed from the equation Vmax-open= Vmax-shut·Factor, for which no maximum permissible energy greater than ten joules is to be taken into consideration and the factor can thus be chosen to be smaller than, equal to or greater than "1". Subsequently, the algorithm ALGO6 is activated again which in the steps S111 through S124 produces the travel curve for the opening operation from the parameters "Xmax", "Vmax-open" and "Xmax-open". An algorithm, for example the algorithm ALGO1 from the step S23 onward, as shown in the FIG. 4, can be used for the control of the door movement for the operations of opening and closing as indicated by a step S126.

The algorithm ALGO6 for the computation of travel curves matched to door parameters for the operations of opening and closing is explained in more detail in connection with the FIG. 10. The parameters "Xmax", "Amax-shut", "Amax-open", "Vmax-shut" and "Vmax-open" necessary for the computation are generated by the algorithm ALGO5. The algorithm ALGO6 is started in the step S111. The acceleration travel distance "Sb" computed in a step S112 is that travel path which is traversed while the door is accelerated to the final speed "Vmax". The maximum slope "Mmax" is computed using "Sb" and "Vmax" in a step S113. The travel curve consisting of three segments with the corresponding support points and slopes at the support points is defined in a step S114. The factor "p" of 0 to 99% serves for the variation of the slope at the first and last support points. In a step S115, the position values of the beginning and ending support points of the first segment are fixed and a parameter "Delta X" is defined. "Delta X" is the incremental width by which "X1" is increased and which is dependent on the maximum door width "Xmax". In steps S116 through S119, the algorithm ALGO6 computes the first segment and displaces the second support point (X1, Y1) of the first segment by the value "Delta X" beginning with "Sb" and continuing to the right until the computed $X^3$ parabola between "X0" and "X1" displays a maximum slope of "Mz", which is at most equal to "Mmax". In a step S120, the position values of the beginning and ending support points of the third segment are fixed, by which the third segment is computed in a step S121. In a step S122, the position values of the first and second support points of the second segment are fixed, by which the second segment is computed in a step S123. The algorithm ALGO6 is completed at the step S124.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for controlling movement of an elevator car door coupled to a door drive connected to a drive control for the operations of opening, closing and reversing the door along a travel path comprising the steps of:

a. storing an algorithm for computing a continuous travel curve defining values of door speed as a function of door position for an elevator door, the travel curve being formed of a plurality of adjacent segments, the algorithm including a mathematical function for computing each of the segments, a first one of the segments defined by an $X^3$ parabola mathematical function, a second one of the segments defined by a straight line mathematical function and a third one of the segments defined by an $X^3$ parabola mathematical function, X being a value of door position;

b. inputting door speed and door position values for a beginning point and an ending point for each segment of the travel curve into said algorithm and computing said continuous travel curve according to the mathematical functions;

c. sensing a door operation command signal generated by an elevator control associated with the elevator door; and d. controlling movement of the elevator door in response to the door operation command signal by generating a door drive control signal to a door drive control for the elevator door, the door drive control signal representing values of door speed as a function of door position defined by the continuous travel curve.

2. The method according to claim 1 wherein the continuous travel curve includes a first travel curve for opening the elevator door and a second travel curve for closing the elevator door and further including the steps of:

e. storing another algorithm including a mathematical function for computing a continuous first reversal travel curve for decelerating the elevator door during a door reversal operation, and a mathematical function for computing a continuous second reversal travel curve for accelerating the elevator door during the door reversal operation;

f. upon detecting a cause for door reversal during movement of the elevator door according to one of the first and second travel curves, using the current values of door speed, door position and curve slope from the one of the first and second travel curves as beginning support points for computing the first reversal travel curve; and g. controlling movement of the elevator door by generating the door drive control signal to the door drive control for the elevator door, the door drive control signal representing values of door speed as a function of door position defined by the first reversal travel curve.

3. The method according to claim 2 further including the steps of:

h. using the current values of door speed, door position and curve slope from the other one of the first and second travel curves as ending support points for computing the second reversal travel curve; and i. after the elevator door stops at an end of the first reversal travel curve, controlling movement of the elevator door by generating the door drive control signal to the door drive control for the elevator door, the door drive control signal representing values of door speed as a function of door position defined by the second reversal travel curve.

4. A method for controlling movement of an elevator car door coupled to a door drive connected to a drive control for the operations of opening, closing and reversing the door along a travel path comprising the steps of:

a. storing one algorithm including at least one mathematical function for computing a continuous travel curve defining values of door speed as a function of door position for an elevator door and storing another algorithm including a mathematical function for computing a continuous first reversal curve for decelerating the elevator door during a door reversal operation, and a mathematical function for computing a continuous second reversal curve for accelerating the elevator door during the door reversal operation;

b. computing the travel curve according to the mathematical function to generate target values of door speed as a function of door position;

c. sensing a door operation command signal generated by an elevator control associated with the elevator door;

d. controlling movement of the elevator door in response to the door operation command signal by generating a door drive control signal to a door drive control for the elevator, the door drive control signal representing a difference between actual values of door speed and the target values of door speed according to the travel curve;

e. ascertaining the actual values of door speed as a function of door position during operation of the elevator door;

f. upon detecting a cause for door reversal during movement of the elevator door according to travel curve, using the current values of door speed, door position and curve slope from the travel curve as beginning support points for computing the first reversal curve; and     g. controlling movement of the elevator door by generating the door drive control signal to the door drive control for the elevator door, the door drive control signal representing values of door speed as a function of door position defined by the first reversal curve.

5. The method according to claim 4 wherein the travel curve includes at least one curve segment having a beginning support point and an ending support point and the mathematical function defines a portion of the travel curve between the support points.

6. The method according to claim 4 wherein the travel curve includes a plurality of sequential curve segments each having a beginning support point, an ending support point and an associated predetermined mathematical function defining a portion of the travel curve between the support points, the beginning support point of each curve segment after a first one of the curve segments corresponding with the ending support point of an immediately preceding one of the curve segments.

7. The method according to claim 4 wherein the mathematical function is one of a straight line function and a parabola function.

8. The method according to claim 4 wherein the algorithm includes the one mathematical function for computing the travel curve as a continuous first travel curve for opening the elevator door, at least a second mathematical function for computing a continuous second travel curve for closing the elevator door, at least a third mathematical function for computing a continuous first reversal curve for decelerating the elevator door during a door reversal operation, and at least a fourth mathematical function for computing a continuous second reversal curve for accelerating the elevator door during the door reversal operation.

9. The method according to claim 4 wherein said step b. includes storing in tabular form values of rotational speed of a door drive motor corresponding to the values of door speed from the travel curve and said step d. includes reading the values of rotational speed to generate the door drive control signal.

10. The method according to claim 4 wherein the algorithm includes a first algorithm (ALGO1) for controlling operations of the elevator door, a second algorithm (ALGO2) for computing the travel curve for opening and closing the elevator door, a third algorithm (ALGO3) for controlling movement of the elevator door and a fourth algorithm (ALGO4) for controlling reversal of the elevator door, and wherein said step b. is performed utilizing the first and second algorithms, said step d. is performed utilizing said third algorithm during opening and closing operations of the elevator door and said step g. is performed utilizing said fourth algorithm during reversing operations of the elevator door.

11. The method according to claim 10 including a step of storing the values of door speed as a function of door position computed according to the second algorithm (ALGO2) and said step d. includes reading the stored values of door speed to generate the door drive control signal.

12. The method according to claim 10 wherein the mathematical function of the fourth algorithm (ALGO4) is a parabola function.

13. The method according to claim 4 including a step of storing a learning algorithm (ALGO5) for controlling a learning operation for ascertaining parameters of the elevator door and computing the travel curve matched to the door parameters.

14. The method according to claim 13 including a step of ascertaining values for a door width, a door mass, a friction force, a maximum acceleration and a maximum speed of the elevator door during the learning operation and generating values of maximum door width, maximum acceleration and maximum speed as the door parameters.

15. A method for controlling movement of an elevator car door coupled to a door drive connected to a drive control for the operations of opening, closing and reversing the door along a travel path comprising the steps of:

a. storing one algorithm including a plurality of mathematical functions for computing continuous opening and closing travel curves defining values of door speed as a function of door position for an elevator door, each of the travel curves including a plurality of adjacent segments, each segment being associated with one of the mathematical functions and storing another algorithm including a mathematical function for computing a continuous first reversal curve for decelerating the elevator door during a door reversal operation, and a mathematical function for computing a continuous second reversal curve for accelerating the elevator door during the door reversal operation;

b. computing the travel curves according to the associated mathematical function to generate target values of door speed as a function of door position;

c. sensing a door operation command signal generated by an elevator control associated with the elevator door;

d. controlling movement of the elevator door in response to the door operation command signal by generating a door drive control signal to a door drive control for the elevator, the door drive control signal representing a difference between actual values of door speed and the target values of door speed according to the travel curve;

e. upon detecting a cause for door reversal during movement of the elevator door according to one of the travel curves, using the current values of door speed, door position and curve slope from the one travel curve as beginning support points for computing the first reversal curve and current values of door speed and curve slope from the other one of the travel curves at the same door position for computing the second reversal curve; and f. controlling movement of the elevator door by generating the door drive control signal to the door drive control for the elevator door, the door drive control signal representing values of door speed as a function of door position defined by the first and second reversal curves.

* * * * *